United States Patent
Abraham (10) Patent No.: US 10,140,788 B2
(45) Date of Patent: Nov. 27, 2018

(54) AUTOMATED ENGINEERING ORDER CREATION

(71) Applicant: The Boeing Company, Chicago, IL (US)

(72) Inventor: Mulugheta Abraham, Renton, WA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 15/255,822

(22) Filed: Sep. 2, 2016

(65) Prior Publication Data

US 2018/0068499 A1 Mar. 8, 2018

(51) Int. Cl.
*G07C 5/08* (2006.01)
*G06Q 10/00* (2012.01)

(52) U.S. Cl.
CPC .......... *G07C 5/0816* (2013.01); *G06Q 10/20* (2013.01)

(58) Field of Classification Search
CPC combination set(s) only.
See application file for complete search history.

(56) References Cited

U.S. PATENT DOCUMENTS

| | | | |
|---|---|---|---|
| 7,698,635 B2* | 4/2010 | Grigoriadis | G06F 17/248 715/243 |
| 8,291,043 B2 | 10/2012 | Hadley et al. | |
| 2003/0149935 A1* | 8/2003 | Takizawa | G06F 17/245 715/227 |
| 2009/0281688 A1* | 11/2009 | Hadley | H04L 67/125 701/31.4 |
| 2014/0282479 A1 | 9/2014 | Frayssignes | |

FOREIGN PATENT DOCUMENTS

WO 2009137161 A1 11/2009

OTHER PUBLICATIONS

Search Report for related European Application No. EP17180102; report dated Aug. 9, 2017.

* cited by examiner

*Primary Examiner* — Anne M Atonucci
*Assistant Examiner* — Renee LaRose
(74) *Attorney, Agent, or Firm* — Miller, Matthias & Hull LLP (57) ABSTRACT

A system of one or more processors for creating an engineering order for aircraft from a published, electronic service bulletin is disclosed. The system may include an interface, a database, and an engineering order (EO) module in operative communication with the interface and the database. The EO module may be configured to receive service bulletin data from the interface, access the database, and filter out a plurality of aircraft from the aircraft fleet information in the database based on the service bulletin data. The EO module may be further configured to receive a service bulletin configuration status for the aircraft, and divide the plurality of aircraft into different groups of aircraft based on the service bulletin configuration status for the aircraft. The EO module may be further configured to extract service bulletin data that is applicable to the different groups of aircraft, and generate an engineering order.

20 Claims, 5 Drawing Sheets

FIG. 5

AUTOMATED ENGINEERING ORDER CREATION

FIELD OF THE DISCLOSURE

The present disclosure relates generally to systems and methods for managing service bulletins and, more particularly, to systems and methods for creating an engineering order from a service bulletin.

BACKGROUND OF THE DISCLOSURE

In the aviation industry, aircraft manufacturers provide airline companies with advisory service bulletins for facilitating maintenance, repair, and service of aircraft. The service bulletins are typically lengthy documents that need significant man hours for sorting and finding sections relevant to a particular aircraft. In particular, airline companies spend extensive manual effort creating engineering orders from the service bulletins. An engineering order is a document that airline companies prepare to convey work instructions for specific aircraft to comply with a service bulletin.

SUMMARY OF THE DISCLOSURE

In accordance with one aspect a system of one or more processors for creating an engineering order for aircraft from a published, electronic service bulletin is disclosed. The system may include an interface configured to tag service bulletin data from the electronic service bulletin, a database containing aircraft fleet information, and an engineering order (EO) module in operative communication with the interface and the database. The EO module may be configured to receive service bulletin data from the interface over a network, access the aircraft fleet information in the database, and filter out a plurality of aircraft from the aircraft fleet information in the database based on the service bulletin data. The EO module may be further configured to receive a service bulletin configuration status for the aircraft over the network, and divide the plurality of aircraft into different groups of aircraft based on the service bulletin configuration status for the aircraft. The EO module may be further configured to extract service bulletin data that is applicable to the different groups of aircraft, and generate an engineering order for the different groups of aircraft based on the extracted service bulletin data instantaneously in real-time upon receipt of the service bulletin data from the interface.

In a refinement, the EO module may be further configured to notify users of the published service bulletin.

In another refinement, the EO module may be further configured to create a unique engineering order for each of the different groups of aircraft.

In another refinement, the EO module may be further configured to parse resource data from the service bulletin data for each of the different groups of aircraft and populate an engineering order database with the parsed resource data.

In another refinement, the parsed resource data may include at least one of parts, tools, procedures, and references needed for the unique engineering order for each of the different groups of aircraft.

In another refinement, the EO module may be further configured to notify users of the generated engineering order via at least one of an e-mail system and a mobile application.

In another refinement, the EO module may be further configured to connect to a portal which provides information on parts needed for the generated engineering order.

In another refinement, the EO module may be further configured to transform Xtensible Markup Language (XML) content associated with the generated engineering order into an Air Transport Association (ATA) standard format specification.

In another refinement, the EO module may be further configured to request approval of the generated engineering order.

In another refinement, the EO module may be further configured to transfer the generated engineering order in XML content over the network to an external system.

In accordance with another aspect, an automated method for creating an engineering order for aircraft from an electronic service bulletin is disclosed. The automated method may include receiving service bulletin data over a network from an interface configured to provide tagging of the service bulletin data, accessing a database containing aircraft fleet information, and filtering out a plurality of aircraft in the database impacted by the service bulletin data. The automated method may further include dividing the plurality of aircraft into different groups of aircraft based on configuration data received over the network, extracting service bulletin data that is applicable to each of the different groups of aircraft, and generating an engineering order for each of the different groups of aircraft based on the extracted service bulletin data instantaneously in real-time upon receipt of the service bulletin data from the interface. The receiving, accessing, filtering, dividing, extracting, and generating may be performed by a processor in operative communication with the interface and the database.

In a refinement, the automated method may further include publishing the service bulletin through the interface.

In another refinement, the automated method may further include mining metadata from the service bulletin data related to each of the different groups of aircraft.

In another refinement, the automated method may further include publishing the engineering order for approval by predetermined users instantaneously in real-time upon receipt of the service bulletin data from the interface.

In another refinement, the automated method may further include transforming XML content of the generated engineering order into at least one of ATA S1000D and i2200 compliant schema.

In accordance with another aspect, a non-transitory computer-readable storage medium storing instructions which when executed by a processor creates an engineering order for aircraft from a service bulletin is disclosed. The non-transitory computer-readable storage medium may include instructions for: publishing the service bulletin through an interface operatively connected to the processor, the interface configured to tag service bulletin data; receiving the service bulletin data from the interface over a network; and accessing a database containing aircraft fleet information. The non-transitory computer-readable storage medium may further include instructions for identifying a plurality of aircraft from the aircraft fleet information in the database impacted by the service bulletin data; receiving a service bulletin configuration status for each of the plurality of aircraft; and dividing the plurality of aircraft into different groups of aircraft based on the service bulletin configuration status for each of the plurality of aircraft. The non-transitory computer-readable storage medium may further include instructions for filtering out service bulletin data that is inapplicable to the different groups of aircraft; generating an engineering order for the different groups of aircraft based on the filtered service bulletin data instantaneously in real-time upon receipt of the service bulletin data from the interface; and notifying users of the generated engineering order via at least one of an e-mail system or a mobile application.

In a refinement, the non-transitory computer-readable storage medium may further include instructions for exporting the generated engineering order over the network to an external system.

In another refinement, the non-transitory computer-readable storage medium may further include instructions for requesting selection between creation of a master engineering order and a plurality of different engineering orders for each of the different groups of aircraft.

In another refinement, the non-transitory computer-readable storage medium may further include instructions for parsing resource data from the filtered service bulletin data for each of the different groups of aircraft, the parsed resource data including at least one of parts, tools, procedures, and references needed for the generated engineering order, and populating an engineering order database with the parsed resource data.

In another refinement, the non-transitory computer-readable storage medium may further include instructions interfacing with a portal which provides information and pricing on the parts needed for the generated engineering order.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
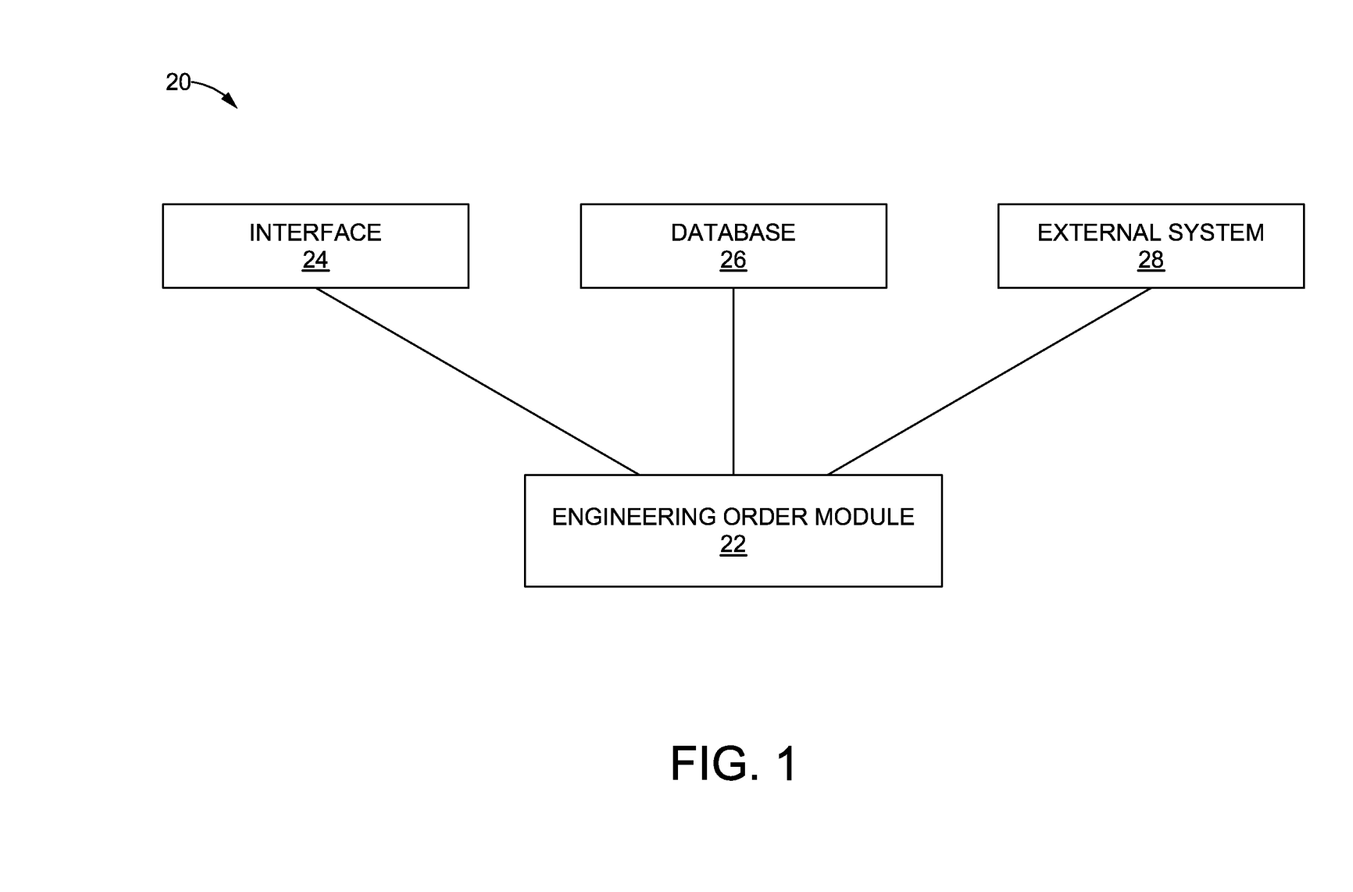
FIG. 1 is a schematic view of a system for creating an engineering order for aircraft from a published, electronic service bulletin, according to one aspect.

Referring now to the drawings, and with specific reference to FIG. 1, a system 20 for creating an engineering order for aircraft from a published, electronic service bulletin is shown, in accordance with certain aspects of the present disclosure. The system 20 includes an engineering order (EO) module 22 in operative communication with an interface 24, such as an application programming interface (API), and an electronic database 26. The EO module 22 may further be in operative communication with one or more external systems 28, such as an enterprise resources planning (ERP) system or a maintenance and engineering (M & E) system.

The interface 24 is configured to tag service bulletin data from the published service bulletin and send the tagged service bulletin data to the EO module 22. The interface 24 may also be configured to automatically publish a service bulletin upon receipt from an aircraft manufacturer. The database 26 contains aircraft fleet information, such as a type of aircraft and a number of aircraft owned by an airline company. In addition, the database 26 may be dynamically updated, such as daily, to reflect changes to a fleet of aircraft owned by the airline company. Although shown and described as having only one interface 24 and one database 26, it is to be understood that the system 20 may have more than one interface 24 and more than one database 26. In fact, various types of interfaces and databases 26 may be used in different configurations of the system 20.

The EO module 22 is implemented using one or more of a processor, a microprocessor, and a processor-based device that may include or be associated with a non-transitory computer readable storage medium having stored thereon computer-executable instructions, or any other suitable means for electronically implementing the system 20. The EO module 22 is configured to operate according to predetermined algorithms or sets of instructions programmed or incorporated into a memory that is associated therewith or accessible thereto.

However, other hardware, software, firmware, and configurations may be used to implement the system 20. Furthermore, the EO module 22, the interface 24, the database 26, and the external system 28 may also include software and hardware networking components to allow communications to and from the EO module 22, the interface 24, the database 26, and the external system 28. Such networking components may provide wireless or wired networking functionality.

Figure 2:
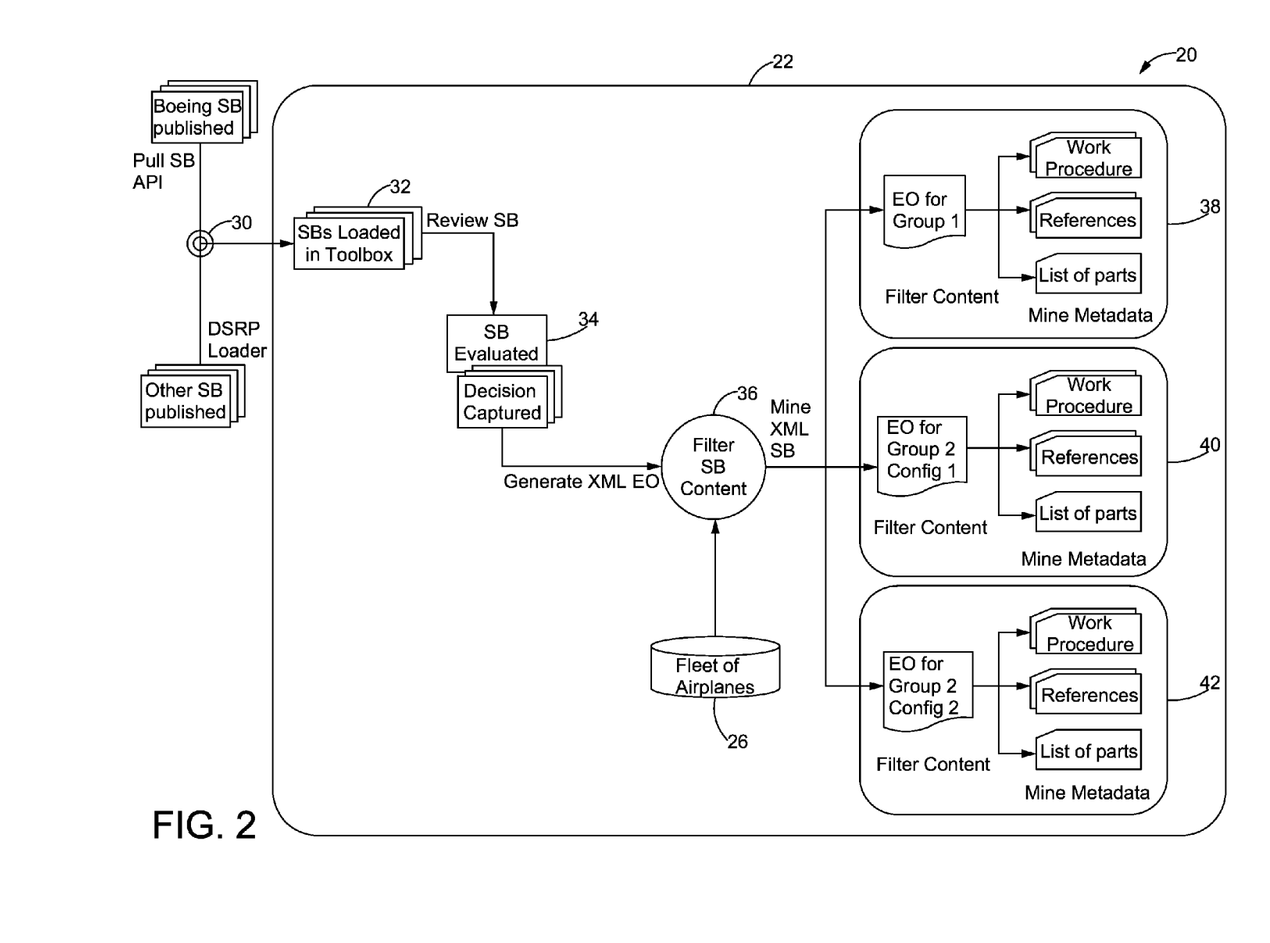
FIG. 2 is another schematic view of the system of FIG. 1, in accordance with another aspect.

Turning now to FIG. 2, with continued reference to FIG. 1, the EO module 22 is configured to receive the tagged service bulletin data from the interface 24 over a network, such as a wireless or wired network. For example, the interface 24 feeds the tagged service bulletin data, such as in Xtensible Markup Language (XML) content, into a loader 30 of the EO module 22. The loader 30 is configured to search, retrieve, and process the service bulletin data, parsing the XML content and loading it into a toolbox, or other application, of the EO module 22, at block 32. For instance, the loader 30 chunks, or separates, the service bulletin data into various sections, such as references, parts, tools, zones, skills, and work instructions. Furthermore, the loader 30 may be configured to fetch new service bulletin data at predetermined time periods, such as daily, hourly, etc.

The EO module 22 is further configured to store the tagged service bulletin data as XML fragments in a database, such as in the database 26 or a separate database localized to the EO module 22. At block 34, after the XML content is loaded into the toolbox, the EO module 22 may optionally notify predetermined users of a published service bulletin, such as via a mobile application, an internal e-mail system, an external e-mail system, or the like. The EO module 22 may also be configured to request approval for creation of an engineering order, such as by prompting the predetermined users to review the service bulletin and approve creation of an engineering order.

At block 36, the EO module 22 is configured to filter the service bulletin data in order to generate the engineering order. More specifically, the EO module 22 is configured to access the aircraft fleet information in the database 26, and filter out a plurality of aircraft from the aircraft fleet information based on the service bulletin data. For instance, if the service bulletin applies to a specific type of aircraft, the EO module 22 filters out the plurality of aircraft in the fleet owned by the airline company that is of the specific type.

The EO module 22 is further configured to divide the plurality of aircraft that was filtered at block 36 into different groups 38, 40, 42 based on a service bulletin configuration status for each of the aircraft. The service bulletin configuration status signifies a modification state of the aircraft in relation to prior service bulletin changes still in progress. In one example, the service bulletin configuration status may be manually input into an interface, such as the interface 24 or a separate interface localized to the EO module 22, by a user who assigns aircraft to different configurations prior to filtering by the EO module 22. Once the service bulletin configuration status is received, the EO module 22 then divides the plurality of aircraft into different groups.

In another example, the service bulletin configuration status may be provided by the external system 28 and sent to the EO module 22 over the network. In this example, the service bulletin configuration status is automatically fed into the EO module 22, which then filters the plurality of aircraft into different groups 38, 40, 42. For instance, if the service bulletin applies to two specific types of aircraft, the EO module 22 may initially filter the plurality of aircraft into "Group 1" (shown as group 38 in FIG. 2) and "Group 2" (shown as groups 40 and 42 in FIG. 2). Based on the service bulletin configuration status, the EO module 22 further filters the plurality of aircraft and further divides the groups.

For instance, if the aircraft in "Group 2" has two different configurations, the EO module 22 may divide "Group 2" into "Group 2 Configuration 1" (shown as group 40 in FIG. 2) and "Group 2 Configuration 2" (shown as group 42 in FIG. 2). Continuing the example, group 40 comprises a first configuration, such as a post-service bulletin configuration, wherein the aircraft have incorporated a modification according to a prior service bulletin. Group 42 comprises a second configuration, such as a pre-service bulletin configuration, wherein the aircraft have yet to incorporate the modification according to the prior service bulletin. As such, a different engineering order may be needed for the first configuration than for the second configuration.

Furthermore, the EO module 22 may be configured to filter out or eliminate service bulletin data that is inapplicable to the groups 38, 40, 42 and extract service bulletin data that is applicable to the different groups 38, 40, 42. Based on the extracted service bulletin data, the EO module 22 generates the engineering order. The EO module 22 may create a single, master engineering order for all of the groups 38, 40, 42 and/or a unique engineering order for each of the different groups 38, 40, 42. The EO module 22 may have a default setting to generate the master engineering order and/or the unique engineering orders with the default setting being adjustable by the user. In another example, the EO module 22 may be configured to request selection between creation of a master engineering order and a plurality of different engineering orders for each of the different groups 38, 40, 42.

Figure 3:
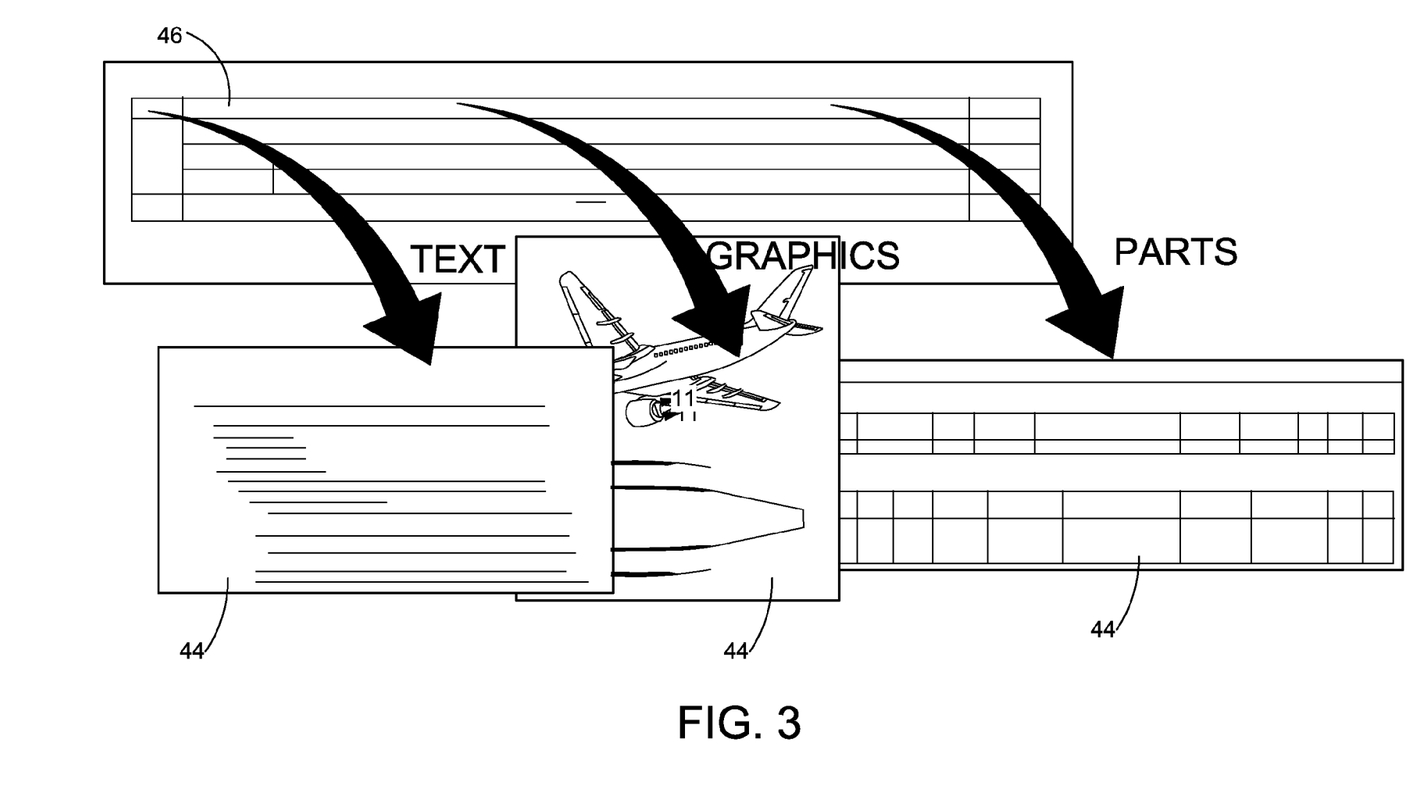
FIG. 3 is a diagram of example displays from the system of FIG. 1, in accordance with another aspect.

The EO module 22 is configured to create the engineering order instantaneously in real-time upon receipt of the service bulletin data from the interface 24. In addition, the EO module 22 is configured to mine metadata from the service bulletin data related to each of the different groups 38, 40, 42 of aircraft. In other words, the EO module 22 parses resource data from the service bulletin data for each of the different groups 38, 40, 42. For example, as shown in FIG. 3, the parsed resource data 44 includes parts, tools, procedures, references, and/or other information needed to execute the engineering order 46 on the groups 38, 40, 42 of aircraft.

If the generated engineering orders are unique to each of the different groups 38, 40, 42, the parsed resource data 44 for each group may vary. Different parts, tools, procedures, references, and/or other information may be needed for each of the unique engineering orders depending on which group 38, 40, 42 of aircraft the engineering order applies to. The EO module 22 is further configured to populate an engineering order database with the parsed resource data 44. The engineering order database may comprise the database 26 or a separate database localized to the EO module 22. However, other configurations may be used.

Upon creation of the engineering order, the EO module 22 is configured to notify predetermined users of the generated engineering order. In one example, the EO module 22 may alert predetermined users via an interface in operative communication with the EO module 22, such as the interface 24 or a separate interface localized to the EO module 22. In another example, the EO module 22 may alert predetermined users over the network via an external e-mail system and/or a mobile application, such as on an electronic handheld device. The EO module 22 may be further configured to request approval of the engineering order. For instance, the EO module 22 may be configured to publish the engineering order for approval by the predetermined users instantaneously in real-time upon receipt of the service bulletin data from the interface 24.

Figure 4:
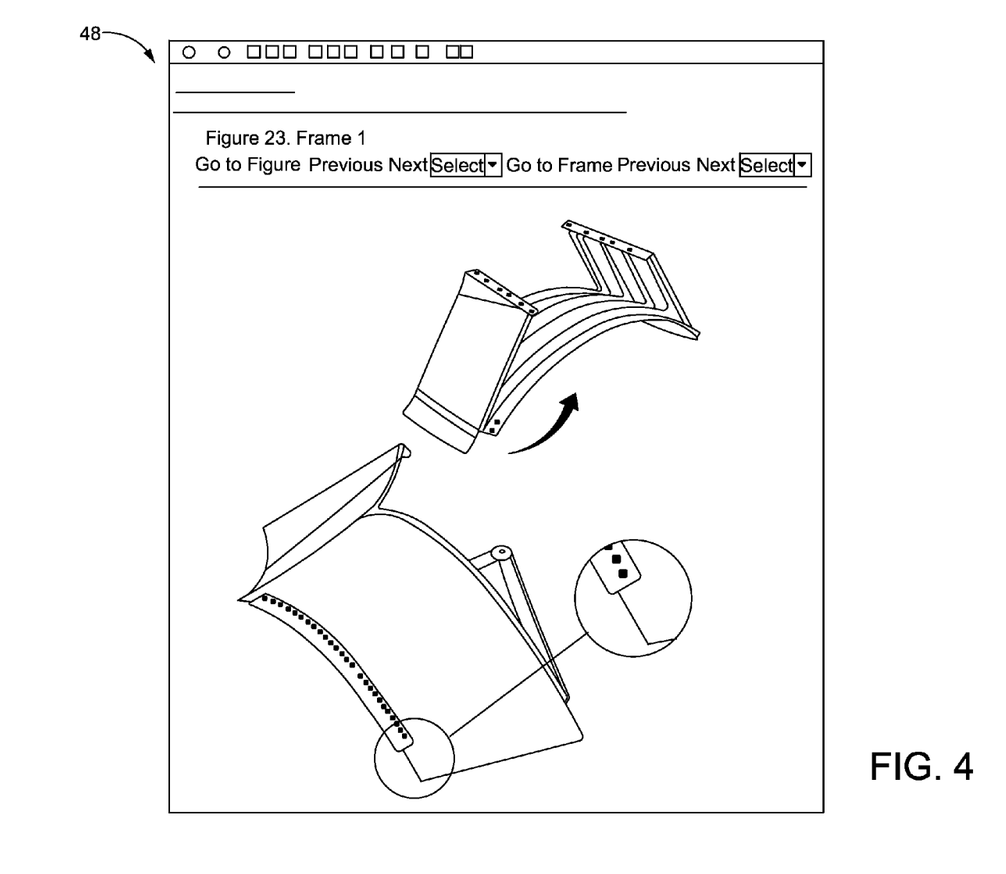
FIG. 4 is an example display of a portal provided by the system of FIG. 1, in accordance with another aspect.

The notification sent by the EO module 22 may include the engineering order(s), a link to the engineering order(s), and/or other information related thereto. For instance, the EO module 22 may be configured to connect to and interface with a portal 48, as shown in FIG. 4, which provides information on parts needed for the engineering order. The portal 48 may list the parts needed to execute the engineering order 46 on the groups 38, 40, 42 of aircraft, as well as their availability and pricing. The users may directly procure the parts through the portal 48.

Furthermore, the EO module 22 may be configured to use the interface 24 or a separate interface localized to the EO module 22 in order to access other inventor management systems to check part availability, such as by location. In addition, relevant services, recommended service bulletins, related service bulletins, relevant technical literature, and other information may be included in the engineering order for further consideration, such as to launch a quotation process on resource production and planning. For multiple service bulletins that are related, the EO module 22 may be further configured to provide part pricing and ordering in bulk such that multiple parts can be added for the different service bulletins.

The engineering order is generated in XML content from the XML content of the service bulletin data. The EO module 22 is configured to transform the XML content of the engineering order into an Air Transport Association (ATA) standard format specification, such as ATA S1000D and i2200 compliant schema. Moreover, the EO module 22 is configured to export the generated engineering order to the external system 28. For instance, the EO module 22 may transfer the engineering order in XML content over the network to the external system 28 for procurement of parts, resources planning, and tracking of execution.

In an example, upon approval of the engineering order by the predetermined users, the EO module 22 instantaneously feeds the engineering order and associated resource data in real-time to the external system 28 via the network. The EO module 22 may use web-service integration to automatically transfer the engineering order to the external system 28. The external system 28 may be configured to utilize the resource data of the engineering order for inventory management, resource production and planning, maintenance forecasting, tracking of due dates, execution of the engineering order, and the like. In so doing, creation of the engineering order from the service bulletin and transmission of engineering order data to the external system are achieved without human interaction.

From the foregoing, it can be seen that the teachings of this disclosure can find industrial application, technical effects and benefits in any number of different situations, including but not limited to, management and maintenance of complex products, such as aircraft. The present disclosure provides systems and methods for creating an engineering order for aircraft from an electronic service bulletin. More specifically, the disclosed system and method automatically extract data directly from source documentation to produce an engineering order.

In particular, the disclosed system and method utilize richly tagged service bulletin data and the aircraft fleet database 26 to filter relevant resource data and feed the same to the external system 28, such as an ERP system, for planning and execution of the engineering order. The resource data may be manipulated and viewed to track aircraft modifications. In addition, the disclosed system and method transform the engineering order into ATA compliant schema in order to allow other documents to be easily merged into the engineering order. The system and method also publish the service bulletin and provide notification to predetermined users for compliance purposes. In so doing, the service bulletin and the engineering order are managed in a single application. As a result, the engineering order(s) are generated instantaneously in real-time upon receipt of the service bulletin data from the interface 24, thereby eliminating countless hours of manual time and labor.

Figure 5:
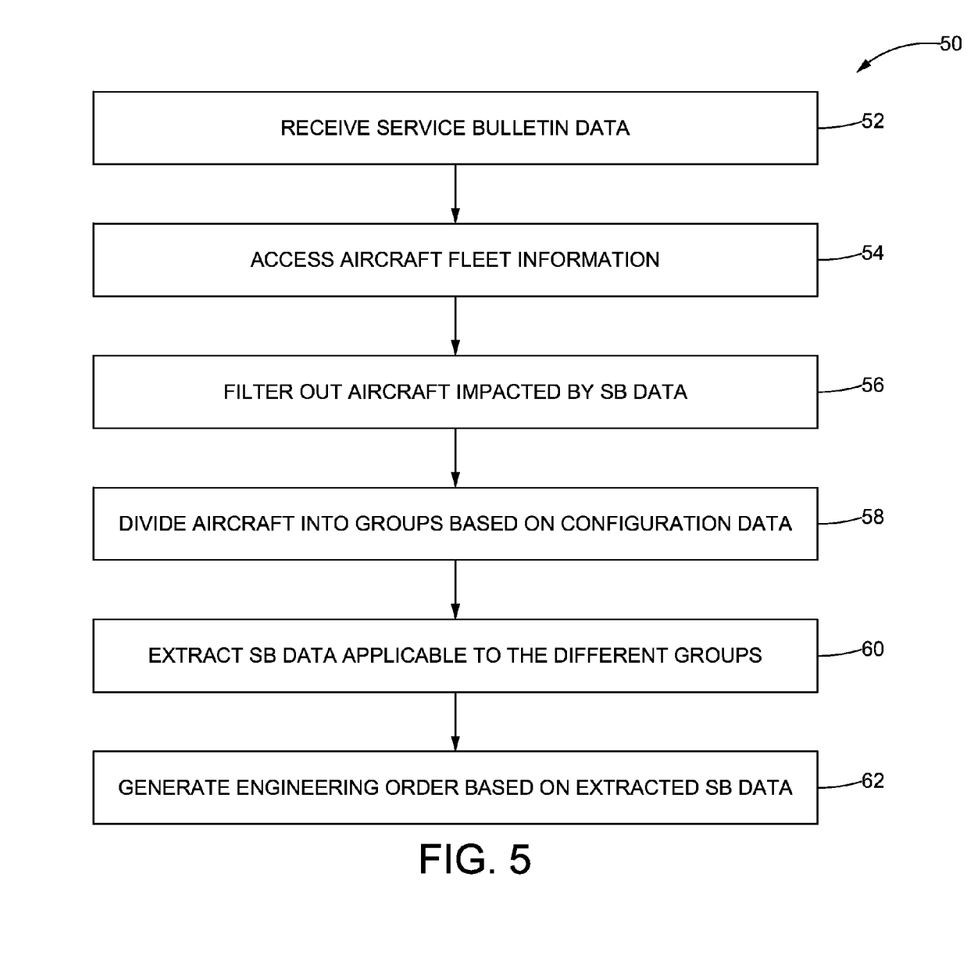
FIG. 5 is a flowchart illustrating an automated process for creating an engineering order for aircraft from an electronic service bulletin, in accordance with another aspect.

Turning now to FIG. 5, with continued reference to FIGS. 1-4, an automated process 50 for creating an engineering order for aircraft from an electronic service bulletin is shown, in accordance with another aspect. At block 52, the EO module 22 receives service bulletin data over the network from the interface 24. The interface 24 is configured to provide tagging of the service bulletin data. At block 54, the EO module 22 accesses the database 26 containing aircraft fleet information. The EO module 22 filters out a plurality of aircraft in the database 26 impacted by the service bulletin data, at block 56.

At block 58, the EO module 22 divides the plurality of aircraft into different groups 38, 40, 42 of aircraft based on configuration data, such as the service bulletin configuration status. The EO module 22 extracts service bulletin data that is applicable to each of the different groups 38, 40, 42 of aircraft, at block 60. At block 62, the EO module 22 generates an engineering order for each of the different groups 38, 40, 42 of aircraft based on the extracted service bulletin data.

It is to be understood that the flowchart in FIG. 5 is shown and described as an example only to assist in disclosing the features of the disclosed systems, and that more or less steps in a same or different order than shown may be included in the processes corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A system of one or more processors for creating an engineering order for aircraft from a published, electronic service bulletin, the system comprising:
    an interface configured to tag service bulletin data from the electronic service bulletin;
    a database containing aircraft fleet information; and
    an engineering order (EO) module in operative communication with the interface and the database, the EO module having one or more processor and non-transitory computer readable storage medium and configured to:
        receive tagged service bulletin data from the interface over a network;
        access the aircraft fleet information in the database;
        filter out a plurality of aircraft from the aircraft fleet information in the database based on the tagged service bulletin data;
        receive a service bulletin configuration status for the aircraft over the network;
        divide the plurality of aircraft into different groups of aircraft based on the service bulletin configuration status for the aircraft;
        extract service bulletin data from the tagged service bulletin data that is applicable to the different groups of aircraft, and;
        generate an engineering order for the different groups of aircraft based on the extracted service bulletin data instantaneously in real-time upon receipt of the service bulletin data from the interface.

2. The system of claim 1, wherein the EO module is further configured to notify users of the published service bulletin.

3. The system of claim 1, wherein the EO module is further configured to create a unique engineering order for each of the different groups of aircraft.

4. The system of claim 3, wherein the EO module is further configured to parse resource data from the service bulletin data for each of the different groups of aircraft and populate an engineering order database with the parsed resource data.

5. The system of claim 4, wherein the parsed resource data includes at least one of parts, tools, procedures, and references needed for the unique engineering order for each of the different groups of aircraft.

6. The system of claim 1, wherein the EO module is further configured to notify users of the generated engineering order via at least one of an e-mail system and a mobile application.

7. The system of claim 1, wherein the EO module is further configured to connect to a portal which provides information on parts needed for the generated engineering order.

8. The system of claim 1, wherein the EO module is further configured to transform Xtensible Markup Language (XML) content associated with the generated engineering order into an Air Transport Association (ATA) standard format specification.

9. The system of claim 1, wherein the EO module is further configured to request approval of the generated engineering order.

10. The system of claim 1, wherein the EO module is further configured to transfer the generated engineering order in XML content over the network to an external system.

11. An automated method for creating an engineering order for aircraft from an electronic service bulletin, the automated method comprising:
    receiving tagged service bulletin data over a network from an interface configured to provide tagging of the service bulletin data;
    accessing a database containing aircraft fleet information;
    filtering out a plurality of aircraft in the database impacted by the tagged service bulletin data;
    dividing the plurality of aircraft into different groups of aircraft based on configuration data received over the network;
    extracting the tagged service bulletin data that is applicable to each of the different groups of aircraft; and
    generating an engineering order for each of the different groups of aircraft based on the extracted service bulletin data instantaneously in real-time upon receipt of the service bulletin data from the interface, the receiving, accessing, filtering, dividing, extracting, and generating being performed by a processor in operative communication with the interface and the database.

12. The automated method of claim 11, further comprising publishing the service bulletin through the interface.

13. The automated method of claim 11, further comprising mining metadata from the service bulletin data related to each of the different groups of aircraft.

14. The automated method of claim 11, further comprising publishing the engineering order for approval by predetermined users instantaneously in real-time upon receipt of the service bulletin data from the interface.

15. The automated method of claim 11, further comprising transforming XML content of the generated engineering order into at least one of ATA S1000D and i2200 compliant schema.

16. A non-transitory computer-readable storage medium storing instructions which when executed by a processor creates an engineering order for aircraft from a service bulletin, the non-transitory computer-readable storage medium comprising instructions for:
    publishing the service bulletin through an interface operatively connected to the processor, the interface configured to tag service bulletin data;
    receiving the service bulletin data from the interface over a network;
    accessing a database containing aircraft fleet information;
    identifying a plurality of aircraft from the aircraft fleet information in the database impacted by the tagged service bulletin data;
    receiving a service bulletin configuration status for each of the plurality of aircraft;
    dividing the plurality of aircraft into different groups of aircraft based on the tagged service bulletin configuration status for each of the plurality of aircraft;
    filtering out service bulletin data that is inapplicable to the different groups of aircraft;
    generating an engineering order for the different groups of aircraft based on the filtered service bulletin data instantaneously in real-time upon receipt of the service bulletin data from the interface; and
    notifying users of the generated engineering order via at least one of an e-mail system or a mobile application.

17. The non-transitory computer-readable storage medium of claim 16, further comprising instructions for exporting the generated engineering order over the network to an external system.

18. The non-transitory computer-readable storage medium of claim 16, further comprising instructions for requesting selection between creation of a master engineering order and a plurality of different engineering orders for each of the different groups of aircraft.

19. The non-transitory computer-readable storage medium of claim 16, further comprising instructions for parsing resource data from the filtered service bulletin data for each of the different groups of aircraft, the parsed resource data including at least one of parts, tools, procedures, and references needed for the generated engineering order, and populating an engineering order database with the parsed resource data.

20. The non-transitory computer-readable storage medium of claim 19, further comprising instructions for interfacing with a portal which provides information and pricing on the parts needed for the generated engineering order.

* * * * *